United States Patent
Favrin et al.

(10) Patent No.: US 12,441,341 B2
(45) Date of Patent: Oct. 14, 2025

(54) METHOD AND SYSTEM FOR CHECKING AN AUTOMATED DRIVING FUNCTION BY REINFORCEMENT LEARNING

(71) Applicant: Bayerische Motoren Werke Aktiengesellschaft, Munich (DE)

(72) Inventors: Andrea Favrin, Loria (IT); Vladislav Nenchev, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 127 days.

(21) Appl. No.: 17/775,097

(22) PCT Filed: Nov. 3, 2020

(86) PCT No.: PCT/EP2020/080740
§ 371 (c)(1),
(2) Date: May 6, 2022

(87) PCT Pub. No.: WO2021/089499
PCT Pub. Date: May 14, 2021

(65) Prior Publication Data
US 2022/0396280 A1 Dec. 15, 2022

(30) Foreign Application Priority Data
Nov. 7, 2019 (DE) ............ 10 2019 130 040.1

(51) Int. Cl.
*G01C 22/00* (2006.01)
*B60W 50/06* (2006.01)
(Continued)

(52) U.S. Cl.
CPC ..... *B60W 50/06* (2013.01); *B60W 2050/0028* (2013.01); *B60W 60/001* (2020.02)

(58) Field of Classification Search
CPC .............. B60W 50/06; B60W 60/001; B60W 2050/0028
See application file for complete search history.

(56) References Cited

U.S. PATENT DOCUMENTS

2012/0253514 A1 10/2012 Sugimoto et al.
2017/0364831 A1 12/2017 Ghosh et al.
(Continued)

FOREIGN PATENT DOCUMENTS

CN 108791308 A 11/2018
CN 109733415 A 5/2019
(Continued)

OTHER PUBLICATIONS

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (two (2) pages).
(Continued)

*Primary Examiner* — Adam M Alharbi
(74) *Attorney, Agent, or Firm* — Crowell & Moring LLP

(57) ABSTRACT

A method for checking an automated driving function by reinforcement learning includes providing at least one specification of an automated driving function; generating a scenario, the scenario being specified by a first set of parameters; and determining a reward function such that the reward is greater in the event in which the scenario fails to meet the at least one specification in a simulation, than in the event in which the scenario meets the at least one specification in the simulation.

8 Claims, 3 Drawing Sheets

(51) Int. Cl.
*B60W 50/00* (2006.01)
*B60W 60/00* (2020.01)

(56) References Cited

U.S. PATENT DOCUMENTS

| | | | |
|---|---|---|---|
| 2018/0293512 | A1 | 10/2018 | Koseki et al. |
| 2019/0049342 | A1* | 2/2019 | Anderson .......... G01C 21/3415 |
| 2019/0087529 | A1 | 3/2019 | Steingrimsson et al. |
| 2019/0180502 | A1* | 6/2019 | England .................. G01S 7/417 |
| 2019/0272558 | A1 | 9/2019 | Suzuki et al. |
| 2019/0310649 | A1 | 10/2019 | Halder |

FOREIGN PATENT DOCUMENTS

| | | |
|---|---|---|
| CN | 110073376 A | 7/2019 |
| DE | 11 2017 002 604 T5 | 2/2019 |
| DE | 10 2018 217 004 A1 | 4/2019 |
| FR | 3077666 A1 | 8/2019 |
| KR | 10-2019-0076628 A | 7/2019 |

OTHER PUBLICATIONS

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

Qin, X. et al., "Automatic Testing and Falsification with Dynamically Constrained Reinforcement Learning", arxiv.org, Cornell University Library, Oct. 30, 2019, pp. 1-7, XP081522972, (seven (7) pages).

Wang, X. et al., "Falsification-Based Robust Adversarial Reinforcement Learning" arxiv.org, Jul. 17, 2020, pp. 1-12, XP081713323, (12 pages).

Kato K. et al., "Falsification of Cyber-Physical Systems with Reinforcement Learning", 2018 IEEE Workshop on Monitoring and Testing of Cyber-Physical Systems (MT-CPS), IEEE, Apr. 10, 2018, pp. 5-6, XP033382505, (two (2) pages).

Tuncali, C.E, et al., "Simulation-based Adversarial Test Generation for Autonomous Vehicles with Machine Learning Components", 2018 IEEE Intelligent Vehicles Symposium (IV), IEEE, Jun. 26, 2018, pp. 1555-1562, XP033423320, (eight (8) pages).

Favrin, A. et al., "Learning to falsify automated driving vehicles with prior knowledge" arxiv.org, Cornell University Library, Jan. 25, 2021, pp. 1-6, XP081867038, (six (6) pages).

International Search Report (PCT/ISA/210) issued in PCT Application No. PCT/EP2020/080740 dated Mar. 12, 2021 with English translation (five (5) pages).

German-language Written Opinion (PCT/ISA/237) issued in PCT Application No. PCT/EP2020/080740 dated Mar. 12, 2021 (six (6) pages).

German-language Search Report issued in German Application No. 10 2019 130 040.1 dated Jul. 10, 2020 with partial English translation (12 pages).

Chinese-language Office Action issued in Chinese Application No. 202080073227.2 dated Jan. 24, 2025 with partial English translation (13 pages).

Yong, L., "Intelligent Optimization Algorithms", Shanghai People's Publishing House, Aug. 31, 2019, pp. 241-253 (13 pages).

Chinese-language Search report issued in Chinse Application No. 2020800732272 dated Jul. 1, 2025 with English (machine) translation (4 pages).

\* cited by examiner

METHOD AND SYSTEM FOR CHECKING AN AUTOMATED DRIVING FUNCTION BY REINFORCEMENT LEARNING

BACKGROUND AND SUMMARY OF THE INVENTION

The present disclosure relates to a method and a system for checking an automated driving function by reinforcement learning. The present disclosure relates in particular to the generation of scenarios that violate a specification of an automated driving function.

Driving assistance systems for automated driving are becoming steadily more important. The automated driving can take place with different levels of automation. Illustrative levels of automation are assisted, semiautomated, highly automated or fully automated driving. These levels of automation have been defined by the German Federal Highway Research Institute (BASt) (see BASt publication "Forschung kompakt", issue November 2012). By way of example, vehicles with level 4 are on-the-road fully autonomously during city operation.

A great challenge for the development of autonomous driving functions is the stringent verification and validation in order to achieve compliance with the safety guidelines and a satisfactory level of customer confidence. Conventional test approaches scale only inadequately for autonomous driving, since they require large numbers of real journeys for any approval.

One possible approach to verifying and assessing self-driving vehicles, which need to master a plurality of possible traffic situations, lies in a virtual simulation environment. In order to obtain a meaningful assessment of an autonomous driving function from the simulation, the simulated environment needs to be sufficiently realistic. Moreover, the permissible behavior (specification) of the autonomous vehicle needs to be automatically examinable, and the test scenarios carried out need to cover all typical cases and also rare but realistic driving situations.

While there are a few approaches to meeting the first two requirements, meeting these requirements is no easy task owing to the high dimensionality and non-convexity of the relevant parameter space. Data-controlled approaches provide a remedy to a certain extent, but the analysis of large volumes of real data cannot guarantee that all relevant scenarios have been included and tested. As such, most existing approaches are based on a suitable random-sample-based check, which possibly uses analytical models. However, these methods cannot be performed for the entire end-to-end driving function from the sensor data processing to the generated actuator signal and need to be carried out again in full in the event of a system change.

It is an object of the present disclosure to provide a method for checking an automated driving function by reinforcement learning, a storage medium for carrying out the method and a system for checking an automated driving function by reinforcement learning that permit a fast and efficient check on the automated driving function. Moreover, it is an object of the present disclosure to efficiently falsify the automated driving function in order to reveal weaknesses in the automated driving function.

This object is achieved by the subject matter of the claimed invention.

According to one independent aspect of the present disclosure, a method for checking an automated driving function by reinforcement learning is provided. The method comprises providing at least one specification of an automated driving function; generating a scenario, the scenario being indicated by a first parameter set; and ascertaining a reward function in such a way that the reward is higher in a case in which the scenario does not meet the at least one specification in a simulation than in a case in which the scenario meets the at least one specification in the simulation. The reward function can be ascertained for example using a rule-based model.

According to an embodiment of the invention, the reward function that is dependent on the trajectories of all objects in the scenario is ascertained. In particular, the RL agent learns to generate scenarios that maximize a reward and reflect a violation of the specification of the driving function. The learning can thus be speeded up by including available prior knowledge in the training process. This allows the automated driving function to be efficiently falsified in order to reveal weaknesses in the automated driving function.

Preferably, the rule-based model describes a controller of the vehicle for the automated driving function. The controller is a (simplified) model of the behavior of the vehicle driving with the automated driving function.

Preferably, the method further comprises generating a second parameter set, which indicates a modification of the first parameter set. This can be done by an adversarial agent.

Preferably, the method further comprises:
ascertaining an estimate $R_{est}$ of the value of the reward function for a specific scenario by using a rule-based model in a simulation;
generating a further scenario in accordance with a third parameter set $a_{t+1}$, the third parameter set $a_{t+1}$ being determined on the basis of the second parameter set $a_{nn}$ and the parameter set $a_{est}$, which maximizes the estimate $R_{est}$ on the basis of the rule-based model; and
ascertaining the reward function in such a way that the reward R is higher in a case in which the estimate $R_{est}$ of the value of the reward function is lower for a scenario in a simulation than the actual value R of the reward function.

Preferably, the further scenario is generated in accordance with the third parameter set by using an inequation limitation that excludes certain scenarios. The inequation limitation may be defined as follows:

$$a_{nn} - a_{est} | < a_{threshold}$$

Preferably, the further scenario is generated in accordance with the third parameter set by using a projection of the parameter set onto a set of determined scenarios.

According to a further aspect of the present disclosure, a system for checking an automated driving function by reinforcement learning is provided. The system comprises a processor unit configured to carry out the method for checking an automated driving function by reinforcement learning according to the embodiments described in this document.

The system is in particular set up to carry out the method described in this document. The method can implement the aspects of the system described in this document.

The method according to an embodiment of the invention can also be simulated in an HIL (hardware in the loop) environment.

According to a further independent aspect, a software (SW) program is specified. The SW program can be set up to be executed on one or more processors and thereby to carry out the method described in this document.

According to a further independent aspect, a storage medium is specified. The storage medium can comprise an SW program that is set up to be executed on one or more processors and thereby to carry out the method described in this document.

The term "automated driving" can be understood within the context of the document to mean driving with automated longitudinal or transverse guidance or autonomous driving with automated longitudinal and transverse guidance. The automated driving can be for example driving for a relatively long time on the freeway or driving for a limited time when parking or maneuvering. The term "automated driving" covers automated driving with an arbitrary level of automation. Illustrative levels of automation are assisted, semiautomated, highly automated or fully automated driving. These levels of automation have been defined by the German Federal Highway Research Institute (BASt) (see BASt publication "Forschung kompakt", issue November 2012).

Assisted driving involves the driver carrying out the longitudinal or transverse guidance continually while the system undertakes the respective other operation within certain boundaries. Semiautomated driving (SAD) involves the system undertaking the longitudinal and transverse guidance for a certain period of time and/or in specific situations, with the driver needing to monitor the system continually as in the case of assisted driving. Highly automated driving (HAD) involves the system undertaking the longitudinal and transverse guidance for a certain period of time without the driver needing to monitor the system continually; however, the driver must be capable of undertaking the vehicle guidance within a certain time. In the case of fully automated driving (FAD), the system can manage the driving automatically in all situations for a specific application; this application no longer requires a driver.

The aforementioned four levels of automation correspond to SAE levels 1 to 4 of the SAE (Society of Automotive Engineering) J3016 standard. By way of example, highly automated driving (HAD) corresponds to level 3 of the SAE J3016 standard. Further, there is also provision in SAE J3016 for SAE level 5 as the highest level of automation, which is not included in the definition of the BASt. SAE level 5 corresponds to driverless driving, where the system can automatically manage all situations like a human driver during the entire journey; a driver is generally no longer required.

Exemplary embodiments of the disclosure are depicted in the figures and are described in more detail below.

DETAILED DESCRIPTION OF THE DRAWINGS

Unless stated otherwise, identical reference signs are used below for identical and identically acting elements.

Figure 1:
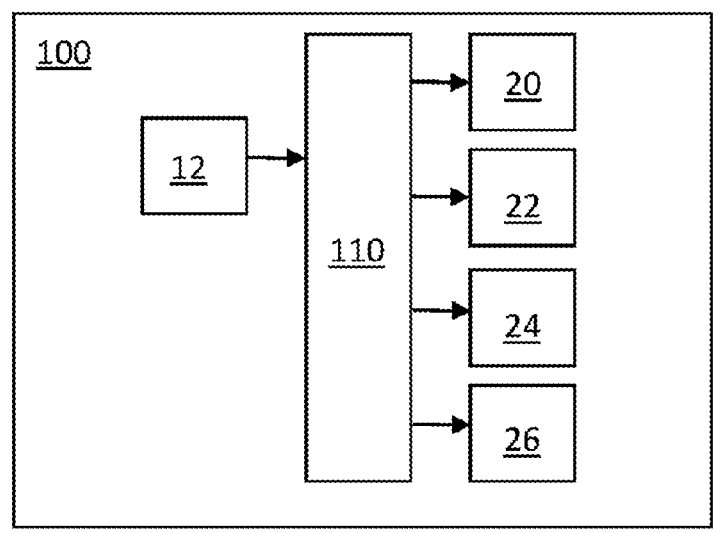
FIG. 1 schematically shows a driving assistance system for automated driving according to embodiments of the present disclosure.

FIG. 1 schematically shows a driving assistance system for automated driving according to embodiments of the present disclosure.

The vehicle 100 comprises the driving assistance system 110 for automated driving. During automated driving, the longitudinal and transverse guidance of the vehicle 100 is performed automatically. The driving assistance system 110 thus undertakes the vehicle guidance. To this end, the driving assistance system 110 controls the drive 20, the transmission 22, the hydraulic service brake 24 and the steering 26 by way of intermediate units, not shown.

To plan and perform the automated driving, surroundings information from a surroundings sensor system that observes the vehicle surroundings is taken by the driver assistance system 110. In particular, the vehicle can comprise at least one environment sensor 12 that is set up to pick up environment data indicating the vehicle surroundings. The at least one environment sensor 12 can comprise a LiDAR system, one or more radar systems and/or one or more cameras, for example.

It is an aim of the present disclosure to take an automatically verifiable specification and a continuous virtual simulation environment for an autonomous or automated driving function as a basis for learning how scenarios that falsify the function can be generated efficiently.

In one example, an ACC (adaptive cruise control) function is considered. The ACC function is set up to maintain a safety distance from a vehicle travelling ahead. A time gap $t_h$, defined as $t_h=h/v$, can be used to formalize the ACC requirements as follows:

Two possible modes: setpoint velocity mode and time interval mode;

In the setpoint velocity mode, a velocity $v_d$ predefined or desired by the driver, i.e. $v_d \in [v_{d,min}; v_{d,max}]$, is supposed to be maintained.

In the time interval mode, a time lead $t_h$, i.e. $t_h \in [t_{h,min}; t_{h,max}]$, for a vehicle travelling ahead is supposed to be maintained.

The system is in the setpoint velocity mode when $v_d \leq h/t_d$, otherwise the system is in the time interval mode. Moreover, the acceleration of the vehicle must comply at all times with $a_c \in [a_{c,min}; a_{c,max}]$.

According to the embodiments of the present disclosure, reinforcement learning (RL) is used, and in particular a reinforcement-learning-based adversarial agent (denoted by Agent in the figures). The RL agent learns to generate scenarios that maximize a specific reward. Since the aim of the agent is to falsify the driving function, the reward function is designed such that the agent receives a high reward if the scenario leads to a violation of the specification and a low reward if the autonomous driving function operates according to the specification.

The agent repeatedly observes the state of the system s, which comprises all the relevant variables for the given specification. Based on the state, the agent performs an action a according to its learnt guideline and receives a corresponding reward R(s,a). The action consists of a finite set of scenario parameters. The agent changes its guideline over the course of time in order to maximize its reward.

The output from the RL agent is a scenario parameter set a, which comprises e.g. an initial vehicle velocity, the desired vehicle, the initial time gap and a velocity profile of the vehicle, which is coded by a finite time series of velocity segments $v_i$, where $t_i \in t_0, t_1, \ldots, t_n$. An initial parameter set $a_0$ is used to begin with and a corresponding initial environment state $s_0$ is calculated. The state $s_t$ includes all the variables that are relevant to the examination of compliance with the specifications, e.g. minimum and maximum acceleration, minimum and maximum distance from the vehicle in front or minimum and maximum time progress, minimum and maximum velocity, etc. All of the above specification instructions can then be either directly recorded or numerically approximated by an inequation in the form A[s; a]−b≤0.

Figure 2:
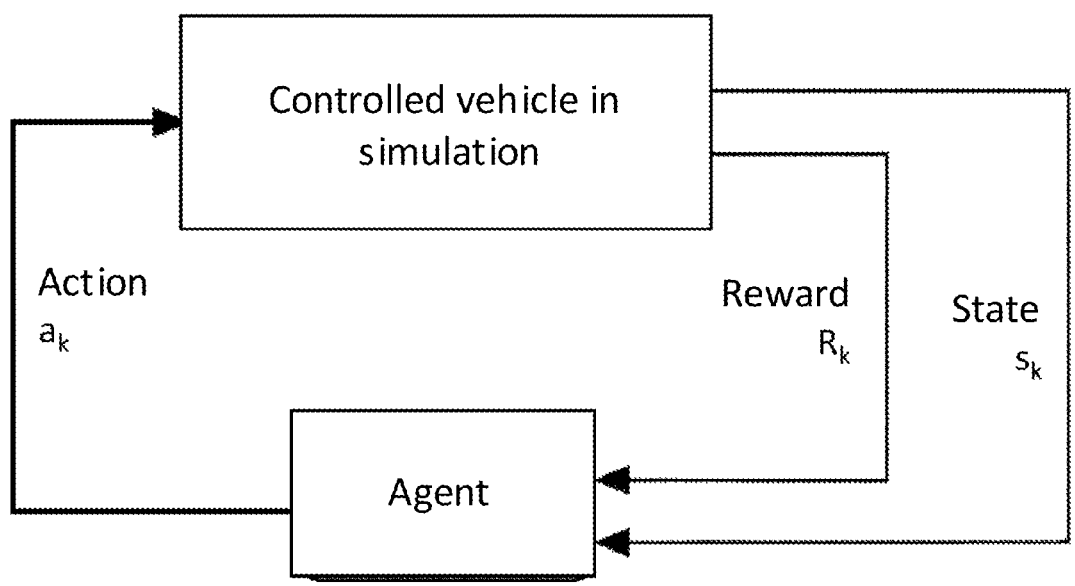
FIG. 2 shows a general diagram for a reinforcement learning approach.

The input of the RL-based agent is the environment state $s_t$ at the time t and the outputs are the modified scenario parameters $a_{t+1}$ for the next pass. The reward function is selected, e.g. so that $R(s,a)=\Sigma_x \max(0,(\exp(x)-1))$, where x denotes the value of an arbitrary line on the left-hand side of the inequation A[s; a]−b≤0 for the specification. This guarantees that the reward is large only when the agent has found a scenario that infringes the specification. FIG. 2 shows a general diagram for this case.

General RL approaches are at the expense of slow, high variance, it can take millions of iterations to learn complex tasks, and each iteration could be cost-intensive. Even more important is the fact that the variation between the learning passes can be very high, which means that some passes of an RL algorithm are successful while others fail on account of chance happenings during initialization and sampling. This high variability of the learning can be a significant obstacle to applying RL. The problem becomes even greater in large parameter spaces.

The aforementioned problems can be alleviated by introducing prior knowledge about the process, which knowledge can be modelled in an appropriate manner by an inequation $g(s_t, a_t)\leq 0$ that excludes scenarios that violate the specification in a trivial way, i.e. it ensures e.g. that the vehicle starts in a nonviolating (safe) state. This inequation is incorporated into the learning process either as a regularization expression in the reward function or as an output limitation for the neural network in order to focus the learning progress. Any continuous variable-compatible RL method, e.g. policy gradient methods or actuator-critical methods, can be used for the RL agent.

Even if the method described above can be used to exclude many parameterizations that infringe the specification in a trivial manner, it still takes a considerable number of passes, which can take up to several days, before scenarios of interest are generated by the RL agent. Even more prior knowledge can therefore be incorporated in order to speed up the learning process.

Figure 3:
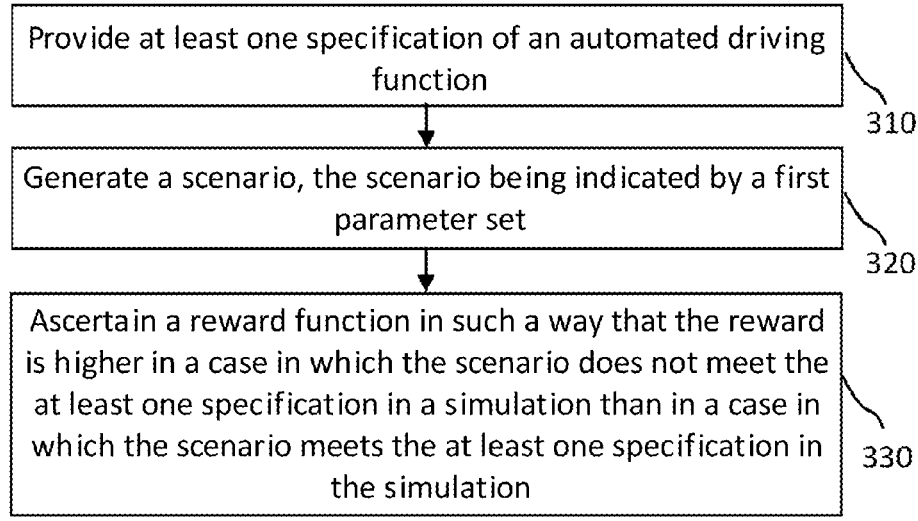
FIG. 3 shows a flowchart for a method for checking an automated driving function according to embodiments of the present disclosure.

FIG. 3 shows a flowchart for a method 300 for checking an automated driving function by reinforcement learning according to embodiments of the present disclosure.

The method 300 comprises, in block 310, providing at least one specification of an automated driving function; in block 320, generating a scenario, the scenario being indicated by a first parameter set; and in block 330, ascertaining a reward function in such a way that the reward is higher in a case in which the scenario does not meet the at least one specification in a simulation than in a case in which the scenario meets the at least one specification in the simulation, the reward function being ascertained using a rule-based model.

Irrespective of the algorithm actually used in the autonomous or automated vehicle, it is assumed that the vehicle is controlled by a traditional (rule-based) control system and the driving dynamics are described by a simple analytical model, all recordable by the differential equation $x_{k+1}=f_k(x_k, s_t, a_t)$, where $x_k$ denotes the state of the vehicle over the execution time. On the basis of this, the following optimization problem can be formulated for the current environment state $s_t$:

$$\max_{a_{est}} R_{est}(a_{est}, s_t)$$

$$x_{k+1} = f_k(x_k, a_{est}, s_t)$$

This delivers to determine a new parameter set $a_{est}$ for an estimate of the maximum reward $R_{est,\,max}$. If the optimization problem is not convex (which is often the case), it is possible to resort to a convex relaxation or other approximation methods.

An RL agent then receives the state $s_t$ and the RL agent reward $$R_{nn}=|R(s_t,a_t)-R_{est}|_n, n\in\{1,2\}$$

in parallel and generates a new parameter set $a_{nn}$. In this way, the RL agent can learn only the difference between the rule-based control behavior and the actual system and not the whole system and can generate a corresponding modification $a_{nn}$. Finally, the new parameter set for the next execution is stipulated as $a_{s+t}=a_{est}+a_{nn}$. In order to avoid an initialization in an unsafe state, the method described above can be used in order to approximate prior knowledge by way of an inequation $g(s_t, a_{est})\leq 0$.

Figure 4:
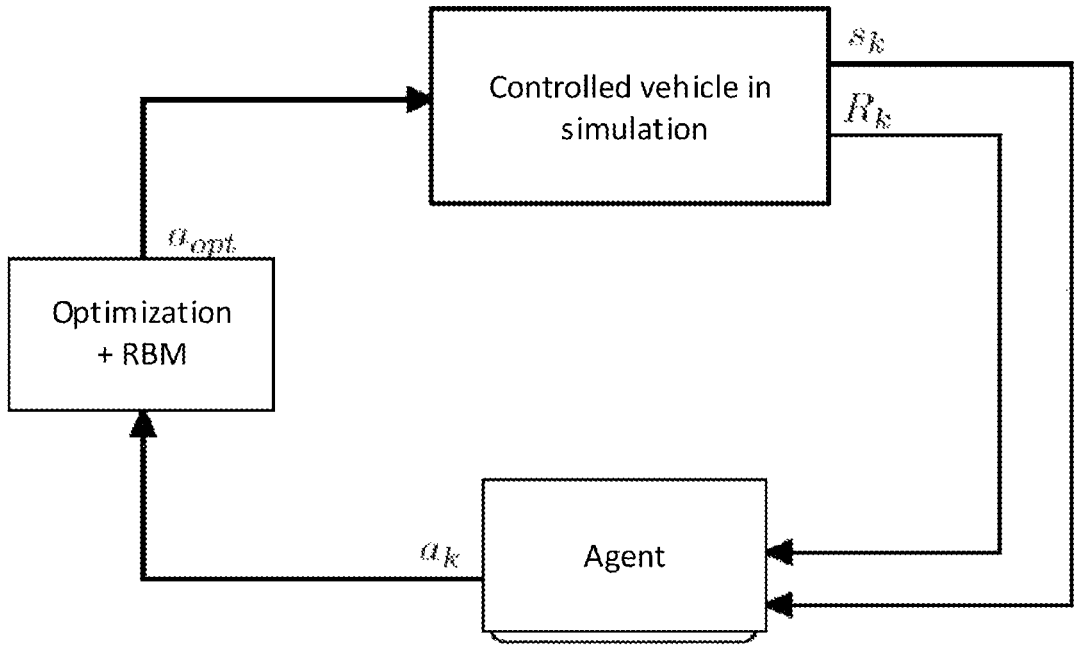
FIG. 4 shows a diagram for checking an automated driving function according to embodiments of the present disclosure.
Figure 5:
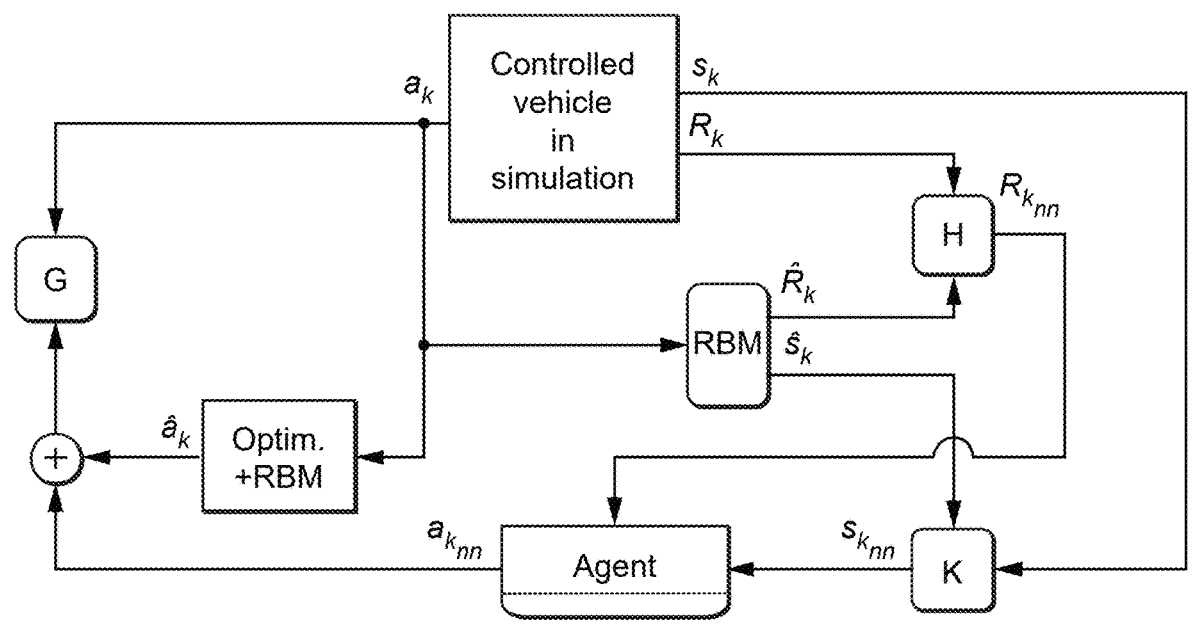
FIG. 5 shows a diagram for checking an automated driving function according to further embodiments of the present disclosure.

FIGS. 4 and 5 show two possible diagrams according to embodiments of the present disclosure that implement this.

The method comprises generating a second parameter set, which indicates a modification of the first parameter set, and generating a further scenario in accordance with a third parameter set, the third parameter set being determined on the basis of the second parameter set and by using the rule-based model.

In some embodiments, the further scenario is generated in accordance with the third parameter set by using an inequation limitation that excludes certain scenarios. This is depicted in FIG. 5. In particular, the block G in FIG. 5 represents an illustrative inequality limit of the following type:

$$a_{nn}-a_{est}|<a_{threshold}$$

The present disclosure is not limited to the inequality limit, however, and a generalized optimization problem can be used, which can be described as follows:

$$a_k = \arg\min_{a\in A}\|a_{nn} - a\|$$

$$\text{s.t. } \hat{x}_{t+1} = \hat{f}(\hat{x}_t, a, \hat{u}_t), t \in [0, T],$$

$$g(\hat{x}_{[0,T]}, a) = 0,$$

Here, a suitable verification input $\hat{u}_t$ is selected in accordance with a specific scenario class. By way of example, in order to prevent a collision with a vehicle travelling ahead.

According to an embodiment of the invention, the reward function is ascertained by using the rule-based model, for example. In particular, the RL agent learns to generate scenarios that maximize a reward and reflect a violation of the specification of the driving function. The learning can thus be speeded up by including available prior knowledge in the training process. This allows the automated driving function to be efficiently falsified in order to reveal weaknesses in the automated driving function.

The invention claimed is:
1. A method for checking an automated driving function by reinforcement learning, the method comprising:

providing at least one specification of an automated driving function;

generating, by reinforcement learning, a scenario, the scenario being indicated by a first parameter set; and ascertaining, by reinforcement learning, a reward function such that a reward is higher in a case in which the scenario does not meet the at least one specification in a simulation than in a case in which the scenario meets the at least one specification in the simulation.

2. The method according to claim 1, wherein the reward function is ascertained by using a rule-based model.

3. The method according to claim 2, wherein the rule-based model describes a controller of the vehicle for the automated driving function, the controller being a model of the vehicle controlled by way of the automated driving function.

4. The method according to claim 1, further comprising:

generating a second parameter set, which indicates a modification of the first parameter set.

5. The method according to claim 4, further comprising:

ascertaining an estimate of a value of the reward function for a specific scenario by using a rule-based model in a simulation;

generating a further scenario in accordance with a third parameter set, the third parameter set being determined based on the second parameter set and an estimated parameter set, which maximizes an estimate based on the rule-based model; and ascertaining the reward function such that the reward is higher in a case in which the estimate of the value of the reward function is lower for a scenario in a simulation than an actual value of the reward function.

6. The method according to claim 5, wherein the further scenario is generated in accordance with a third parameter set by using an inequation limitation that excludes certain scenarios, or a projection of the third parameter set onto a set of determined scenarios.

7. A computer product comprising a non-transitory computer readable medium having stored thereon program code which, when executed on one or more processors, carries out the acts of:

providing at least one specification of an automated driving function;

generating, by reinforcement learning, a scenario, the scenario being indicated by a first parameter set; and ascertaining, by reinforcement learning, a reward function such that a reward is higher in a case in which the scenario does not meet the at least one specification in a simulation than in a case in which the scenario meets the at least one specification in the simulation.

8. A system for checking an automated driving function by reinforcement learning, the system comprising a processor unit configured to carry out a method comprising:

providing at least one specification of an automated driving function;

generating, by reinforcement learning, a scenario, the scenario being indicated by a first parameter set; and ascertaining, by reinforcement learning, a reward function such that a reward is higher in a case in which the scenario does not meet the at least one specification in a simulation than in a case in which the scenario meets the at least one specification in the simulation.

* * * * *